United States Patent
Chintada et al.

(10) Patent No.: US 6,629,261 B1
(45) Date of Patent: Sep. 30, 2003

(54) ENHANCED DATA LINK LAYER SELECTIVE REJECT MECHANISM IN NOISY WIRELESS ENVIRONMENT

(75) Inventors: Lakshmana Rao Chintada, Redmond, WA (US); Liang A. Hong, Redmond, WA (US); Kamyar Moinzadeh, Renton, WA (US); Donald P. Wahlstrom, Woodinville, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 256 days.

(21) Appl. No.: 09/717,498

(22) Filed: Nov. 21, 2000

(51) Int. Cl.[7] .................................................. G02H 3/05
(52) U.S. Cl. .......................... 714/4; 714/43; 714/704; 375/346
(58) Field of Search ............................ 714/4, 8, 16, 18, 714/20, 43, 45, 46, 47, 704, 749; 375/346; 348/616

(56) References Cited

U.S. PATENT DOCUMENTS

| | | |
|---|---|---|
| 4,726,027 A | 2/1988 | Nakamura et al. |
| 4,841,526 A | 6/1989 | Wilson et al. |
| 5,036,518 A | 7/1991 | Tseung |
| 5,222,061 A | 6/1993 | Doshi et al. |
| 5,245,616 A | 9/1993 | Olson |
| 5,319,648 A | 6/1994 | Bux et al. |
| 5,477,550 A | 12/1995 | Crisler et al. |
| 5,517,250 A * | 5/1996 | Hoogenboom et al. .. 348/390.1 |
| 5,553,083 A | 9/1996 | Miller |
| 5,754,754 A | 5/1998 | Dudley et al. |
| 6,145,109 A * | 11/2000 | Schuster et al. ............ 714/752 |
| 6,335,933 B1 | 1/2002 | Mallory |

FOREIGN PATENT DOCUMENTS

| | | |
|---|---|---|
| JP | 60247942 | 5/1987 |
| JP | 610599708 | 9/1987 |
| JP | 01193531 | 3/1991 |
| WO | WO98/42108 | 9/1998 |

OTHER PUBLICATIONS

Osterloh, Heather, "CCNA 2.0 Prep Kit: 640–507 Routing and Switching," Books24×7, Inc., 1999–2002, http://library.books 24×7.com/viewer.asp?bkid=1447&chnkid=460655135&pr=1.

* cited by examiner

*Primary Examiner*—Robert Beausoliel
*Assistant Examiner*—Rita A Ziemer
(74) *Attorney, Agent, or Firm*—Perkins Coie LLP

(57) ABSTRACT

A method of recovering lost frames transmitted between a packet data sending unit and a packet data receiving unit in a data communications system is disclosed. When a frame is successfully received by the packet data receiving unit, it identifies a failure to successfully receive prior frames, i.e., at least one frame prior to the frame successfully received at the packet data receiving unit. The packet data receiving unit starts a selective reject wait timer and determines whether the number of frames missed so far is greater than or equal to a predetermined threshold. If the number of missed frames is greater than or equal to the preset limit, the packet data receiving unit generates a selective reject message that includes a payload indicating a first missed frame and subsequent missed frames. If the number of missed frames is less than the predetermined threshold, the packet data receiving unit waits until the expiration of the selective reject wait timer, or until after the next determination that the number of missed frames meets or exceeds the predetermined threshold. It then sends the selective reject message to the packet data sending unit. Upon successful receipt of the retransmitted missed frames from the packet data sending unit, the packet data receiving unit generates a receive ready message and sends the receive ready message to the packet data sending unit.

20 Claims, 6 Drawing Sheets

ENHANCED DATA LINK LAYER SELECTIVE REJECT MECHANISM IN NOISY WIRELESS ENVIRONMENT

BACKGROUND

1. Field of the Invention

The present invention relates generally to wireless communications, and more particularly, to an improved method for selectively rejecting frames that were lost during transmission between a packet data sending unit and a packet data receiving unit, to improve the throughput of high speed data in a noisy wireless environment.

2. Description of the Prior Art

Fixed wireless systems are used to communicate voice and high speed data (HSD) between a base station (BS) and multiple remote units (RU) over an air-interface. HSD is generally used for web browsing, down loads and file transfer protocols (FTP). All data must be transferred notwithstanding the predictable errors caused by the communications links employed in the system (e.g., a 10E-03 Bit Error Rate (BER)). Accordingly, communication protocols have been developed for transmitting data in discrete blocks commonly referred to as "frames." These frames are evaluated at the receiving end to determine if the data is correctly received. If certain frames are in error or missed, those frames are retransmitted by the sending station.

Communications protocols are commonly based on the layered network architecture such as OSI. This is a 7-layer architecture including a physical layer (connectors, media, electrical signaling) and a data link layer, which packages the data into frames, manages data transmission over a link (error handling and the like), and facilitates access control (when each station may transmit). One way of achieving full-duplex data transmission over a single communication channel utilizes what is known in the art as a "sliding window protocol." At any instant in time, the sender maintains a list of consecutive sequence numbers corresponding to frames it is permitted to send. These frames fall within a "sending window." In the same manner, the receiver maintains a "receiving window" corresponding to the frames it is permitted to accept. The sending and receiving windows do not necessarily have the same upper and lower limits, or the same size. The sequence numbers within the sender's window represent frames sent but not yet acknowledged. Whenever a new data packet arrives from the network layer, it is given the next highest sequence number, and the upper edge of the window is advanced by one. When an acknowledgement is received, the lower edge of the window is advanced by one. The window continuously maintains a list of unacknowledged frames. Since frames currently within the sender's window may be lost or changed during transmission, the sender must keep all the sent frames in memory in the event a retransmission is required. Accordingly, if the maximum window size is "K", the sender needs K buffers to hold the unacknowledged frames in memory. If the window ever exceeds it's maximum size, the sending data link layer must shut off the network layer until a buffer is freed up. The receiving data link layer's window corresponds to the frames it can accept. Any frame that falls outside the window is discarded. When a frame with a sequence number equal to the lower edge of the window is received, that frame is passed to the network layer, an acknowledgment is generated to the sender, and the window is rotated by one. Unlike the sender's window, the receiver's window always remains at its initial size.

An example of a sliding window protocol in a data communications system is disclosed in U.S. Pat. No. 4,841,526. In the '526 patent, the window size of the sending or receiving station is selected in accordance with the speed, length or error rate of the communication link or frame size used to maximize the communication link. The negative acknowledgements sent by the receiving station specify the upper and lower limit of a range of identification numbers of frames unsuccessfully received to increase transmission efficiency. Before data is transmitted, the sending and receiving stations exchange preferred sets of link parameters and generate a modified set of link parameters to resolve potential conflicts. One of the sending and receiving stations stores a table defining the frame sizes for use with different bit error rates of the communication link. The station evaluates the current bit error rate to select the optimum frame size from the table and adjust the frame size. The '526 Patent also discloses a mechanism for selectively rejecting a plurality of missed frames by identifying the number of successive frames that have to be retransmitted from the sending station, as a "payload" in the selective reject message. In this scheme, a single negative acknowledgment message sent by the receiving station specifies the upper and lower limits of a range of identification numbers of frames that were unsuccessfully received by the receiving station.

SUMMARY OF THE INVENTION

In accordance with the present invention, it is an object thereof to provide an improved method for recovering frames that were lost during transmission between a packet data sending unit and a packet data receiving unit in a data communications system.

It is another object of the present invention to provide an improved selective reject mechanism to improve the throughput of high speed data in noisy wireless environments to improve transmission delays.

It is still another object of the present invention to provide an improved selective reject mechanism for use in noisy wireless environments where burst errors can cause a relatively large number of consecutive and non-consecutive data packets to be lost in transmission between a packet data sending unit and a packet data receiving unit.

In accordance with the above objects and additional objects that will become apparent hereinafter, the present invention provides a method of recovering lost frames transmitted between a packet data sending unit and a packet data receiving unit in a data communications system. In accordance with the invention, the packet data receiving unit first identifies a failure to successfully frames received prior to a frame successfully received at the packet data receiving unit. The packet data receiving unit starts a selective reject wait timer and determines whether the number of frames lost so far is greater than or equal to a predetermined threshold. If the number of lost frames is greater than or equal to the preset limit, the packet receiving unit generates a selective reject message that includes a payload indicating a first missed frame and subsequent missed frames. If the number of missed frames is less than the predetermined threshold, the packet data receiving unit waits until the expiration of the selective reject wait timer or until after the next determination that the number of missed frames exceeds the predetermined threshold. It then sends the selective reject message to the packet data sending unit. Upon successful receipt of the retransmitted missed frames from the packet data sending unit, the packet data receiving unit generates a receive ready message and sends the receive ready message to the packet data sending unit.

The present invention will now be described with particular reference to the accompanying drawings.

DETAILED DESCRIPTION OF THE PREFERRED EMBODIMENTS

Figure 1:
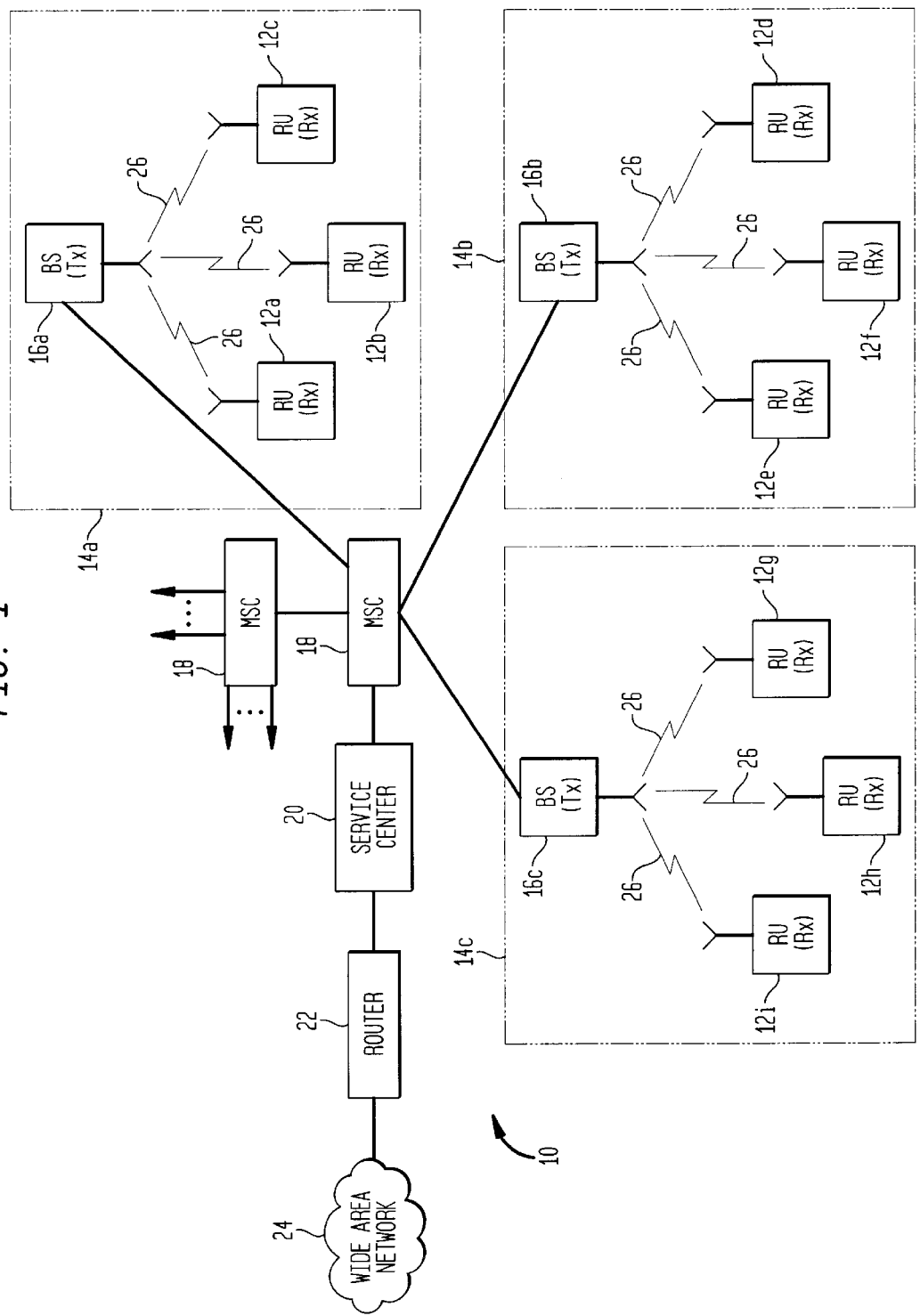
FIG. 1 is a conceptual schematic of a representative wireless communications system.

With reference now to the drawings, FIG. 1 depicts a conceptual diagram of a wireless communications network (WCS) generally characterized by the reference numeral 10. The WCS 10 serves a number of wireless remote units ("RU") $12_{A-I}$ within a geographic area partitioned into a plurality of spatially distinct regions called "cells" $14_{A-C}$. Each cell 14 includes a respective base station ("BS") $16_{A-C}$, and a boundary represented by an irregular shape that depends on terrain, electromagnetic sources and many other variables. The remote units communicate via one or more wireless access technologies (e.g., TDMA, CDMA, FDMA, etc.), providing one or more services (e.g., cordless, cellular, PCS, wireless local loop, SMR/ESMR, two-way paging, etc.) with signals representing audio, video, high speed data (HSD), multimedia, etc. Each BS 16 communicates with a Mobile Switching Center (MSC) 18, also known as a mobile telephone switching office, in accordance with well-known standards. The MSC 18 is interconnected with a customer service center 20 and a router 22 to a wide area network (WAN) 24. The MSC is also connected to local switching offices (not shown) that access wireline terminals, and a toll switching office (not shown). The MSC 18 has several functions, including routing or "switching" calls between wireless communications terminals or base stations or, alternatively, between a wireless communications terminal and a wireline terminal accessible to a MSC 18 through LSOs and/or TSOs. The operation of the WCS is well known and need not be described in detail with respect to the present invention. For the purpose of illustration, a base station (BS) 16 corresponds to a "packet data sending unit" Tx and a remote unit (RU) 12 corresponds to a "packet data receiving unit" Rx. In normal operation data is transferred from Tx to Rx, and Rx sends acknowledgement information back to Tx. The acknowledgment information is communicated in the form of data groups including control information and acknowledgement information, or the acknowledgments are "piggybacked" onto data frames communicated in the opposite direction from Rx to Tx using known protocols. Although the drawings depict an illustrative mobile wireless system, the protocols herein have equal applicability to fixed wireless systems (FWS) which are used to connect a fixed subscriber to a digital switching center and a data service node via a neighborhood antenna.

In the illustrative embodiment, HSD travels over an air data link 26 between Tx and Rx. The data link layer may be "asymmetrical," i.e., the downloading data rate from Tx to Rx can be greater than the uploading data rate from Rx to Tx, or Tx>Rx. As an example, the data downlinked from Tx to Rx is 512 Kilo bits per second (Kbps), and the data uplinked from Rx to Tx is 128 Kbps. In accordance with the sliding window protocol, at any instant in time Tx maintains a list of consecutive sequence numbers corresponding to frames it is permitted to send. These frames fall within a "sending window." In the same manner, Rx maintains a "receiving window" corresponding to the frames it is permitted to accept. The sending and receiving windows do not necessarily have the same upper and lower limits, or the same size. The sequence numbers within the sender's window represent frames sent but not yet acknowledged. Whenever a new data packet arrives from the network layer, it is given the next highest sequence number, and the upper edge of the window is advanced by one. When an acknowledgement is received, the lower edge of the window is advanced by one. The window continuously maintains a list of unacknowledged frames. Since frames currently within the sender's window may be lost or changed during transmission, the sender must keep all the sent frames in memory in the event a retransmission is required. Accordingly, if the maximum window size is "K", the sender needs K buffers to hold the unacknowledged frames in memory. If the window ever exceeds it's maximum size, the sending data link layer must shut off the network layer until a buffer is freed up. The receiving data link layer's window corresponds to the frames it can accept. Any frame that falls outside the window is discarded. When a frame with a sequence number equal to the lower edge of the window is received, that frame is passed to the network layer, an acknowledgment is generated to the sender if the poll bit is set to "1" (P=1), and the window is rotated by one. Unlike the sender's window, the receiver's window always remains at its initial size. In the illustrative example the window size (K)=45, and the maximum sequence number Ns=127 ($2^7$−1). This means that Ns varies from 0 to 127 and subsequently rolls over. In high bandwidth systems, the sequence numbers can go up to 16,383 ($2^{14}$−1). As shown in the drawings, the poll bit setting equals the last acknowledged frame+K−1, or the last acknowledged frame+(K*3)/4. Alternatively, the poll bit may be specified at any other time for explanation purposes only.

The following terminology regarding the interchange of information between Tx and Rx applies throughout this application and is listed below for reference as it is well understood by those skilled in the art:

Send state variable V(S): a variable that identifies the sequence number of the next frame to be transmitted. The V(S) is incremented with each frame transmitted.

Receive state variable V(R): a variable that denotes the number expected to be in the sequence number of the next frame. The V(R) is incremented with the receipt of an in-sequence and error-free frame.

Send sequence Number(Ns): this number indicates to the receiver the sequence number of the next frame that will be transmitted by the sender.

Receiving Number N(R): an expected send sequence number (Ns) of then next to be received frame. It indicates up to N(R)−1 frames that were successfully received.

Acknowledge state variable V(A): the last frame that has been acknowledged by the sender's peer. The Va is updated upon receiving an error free I or Supervisory (S) frame in sequence having a receiving sequence number Nr value is one that is in the range of Va<=Nr<=Vs.

| Type | Description | value 512 Kbps |
|---|---|---|
| K | window size: window size of sliding window protocol. | 45 |
| T200 | Re-establishment/retransmit timer: Tx expects an acknowledgement before the T200 timer expires. Tx retransmits the same packet N200 times before it gets an acknowledgment until T200 expires. | 5 Sec |
| T201 | SREJ Recovery Timer: Acknowledgements for retransmitted out of sequence frames should occur before T201 expires. If T201 expires Tx retransmits the out of sequence I frame N201 times before re-establishment. | 5 Sec |
| T202 | SREJ Retransmit Timer: The out-of-sequence frame should be received before T202 expires, otherwise Rx retransmits the SREJ frame N202 times before re-establishment. | 5 Sec |
| T203 | Idle Timer | 20 Sec |
| T204 | SREJ Wait Timer | 0.5 Sec |
| T205 | Piggy Back Timer | 2 Sec |
| N200 | T200 Retry Count | 5X |
| N201 | T201 Retry Count | 5X |
| N202 | T202 Retry Count | 5X |

The data link layer uses an "Information Frame" or "I"-frame as discussed above, to represent a protocol data unit (PDU) transmitted between a packet data sending unit and a packet data receiving unit (i.e., Tx and Rx). An illustrative frame format is shown below:

| 8 | 7 | 6 | 5 | 4 | 3 | 2 | 1 | |
|---|---|---|---|---|---|---|---|---|
| Address Field (TEI) | | | | | | | | Address field size: 2 octets |
| Length Field | | | | | | | | Length field size: 2 octets |
| Control Field | | | | | | | | Control field size: 2 to 5 octets |
| Information Field | | | | | | | | Info. field size: Up to 251 bytes |

The basic numbering convention is based on bits grouped into octets as specified in the Q.921 recommendation that is well known in the art.

The address field is represented by the Terminal Endpoint Identifier (TEI) assigned to each RU, and two control bits. The address field extension (EA) bit is used to indicate the extension of TEI octets. When set to "0", it signifies that another octet of the TEI follows. A "1" indicates that it is the final octet. The command/response (C/R) bit identifies a frame as either a command or a response. The transmitter sends commands with C/R set to "1" and responses with C/R set to "0". The RU does the opposite with commands with the C/R set to "0" and responses with the C/R set to "1". The address field format is shown below:

| 8 | 7 | 6 | 5 | 4 | 3 | 2 | 1 |
|---|---|---|---|---|---|---|---|
| C/R | TEI (higher order) | | | | | | |
| | TEI (lower order) | | | | | | EA = 1 |

The frame length field indicates the total data link frame length in bytes and includes the data rate as follows:

| | 8 | 7 | 6 | 5 | 4 | 3 | 2 | 1 |
|---|---|---|---|---|---|---|---|---|
| octet 1 | data rate | | RES | | higher order 3 bits | | | |
| octet 2 | Lower order 8 bits | | | | | | | |

The data rate is used for Tx to identify and communicate with different receiving stations. The control field contains the commands, responses, and the sequence numbers to maintain data flow accountability of the link between the Tx and Rx. It also defines the frame functions and invokes logic to control traffic. The content and size of the control field vary according to the use of the frame. The field can be in one of three formats: information (I), supervisory (S), and unnumbered (U).

The information frame (I-frame) which is shown in the drawings, is used to transmit end-user data between Tx and Rx. The information frame may also acknowledge the receipt of data from a transmitting end point. It also can perform such functions as a poll command. Traffic at Tx and Rx is controlled by counters called state variables. These counters will be maneuvered based on the received I-frame control field values. The I-frame control field format is shown below:

| | 8 | 7 | 6 | 5 | 4 | 3 | 2 | 1 |
|---|---|---|---|---|---|---|---|---|
| octet 1 | (higher order) N(S) | | | | | | | 0 |
| octet 2 | N(S) (lower order) | | | | | | | P/F |
| octet 3 | N(R) higher order) | | | | | | | |
| octet 4 | N(R) (lower order) | | | | | RES | | |
| octet 5 | M | EM | RES | | SAPI | | | |

The sequence number Ns is the identification number for the I-frame. Typically the I-frames are numbered in the same order as their transmission. Similar to Q.921, I-frames are always exchanged as command type frames during multiple frame operation on point-to-point connections. A Poll/Final (P/F) or "Poll Bit" is used to solicit a response from the peer entity. When the P bit set to 1 (P=1), the sender Tx will solicit a response frame from Rx. The More (M) bit is used to indicate that the current PDU is the last data unit in a complete application packet. The I-frame may support either an encrypted or unencrypted payload. This is not relevant to the present invention but is included for purposes of illustration with respect to frame formats as the Encryption Mode Enabled/Disabled (EM) bit. Finally, the Service Access Point Identifier (SAPI) includes 4 bits that indicate the target application type. The values are defined as: 0x0000—IP SAPI, 0x0001—OM SAPI, 0x0010—SA SAPI.

The supervisory frame (S-frame) is used to perform such control functions as acknowledgment of frames, request for retransmission of frames, and request for the temporary suspension of frame transmission. The supervisory frame format follows:

| | 8 | 7 | 6 | 5 | 4 | 3 | 2 | 1 |
|---|---|---|---|---|---|---|---|---|
| octet 1 | Reserved | | | | S-Type | | 0 | 1 |
| octet 2 | P/F | N(R) (higher order) | | | | | | |
| octet 3 | | N(R) (lower order) | | | | | | RES |

The supervisory frame supports 3 different command/response types: Receive/Ready (RR); Receive Not Ready (RNR) and Selective Reject (SREJ). N(R) is the expected send sequence number of the next I-frame to be received.

The Poll/Final bit (P/F), unlike an I-frame, can be used to signify either command or response mode. In the command frame, the P/F bit is referred to as the P bit; and in response frame, it is referred to as F bit. The reserved field value is set to 0.

The receive ready (RR) frame format is used to indicate that Rx is ready to receive an I-frame, acknowledge a previously received I-frame numbered up to and including N(R)−1, clear a busy condition that was indicated by the earlier transmission of an RNR frame, and solicit Tx's status by sending an RR command with the P bit set to 1. The RR frame format follows:

| | 8 | 7 | 6 | 5 | 4 | 3 | 2 | 1 |
|---|---|---|---|---|---|---|---|---|
| octet 1 | 0 | 0 | 0 | 0 | 0 | 0 | 0 | 1 |
| octet 2 | P/F | N(R) (higher order) | | | | | | |
| octet 3 | | N(R) (lower order) | | | | | | RES |

The receive not ready (RNR) frame is used to indicate a busy condition where it is unable to accept additional incoming I-frames temporarily. The value of N(R) acknowledges I-frames up to and including N(R)−1. The busy condition can be cleared by sending a RR frame. The RNR also enables Tx to solicit the status of Rx by sending the RNR command with the P bit set to 1. The RNR frame format follows:

| | 8 | 7 | 6 | 5 | 4 | 3 | 2 | 1 |
|---|---|---|---|---|---|---|---|---|
| octet 1 | 0 | 0 | 0 | 0 | 0 | 1 | 0 | 1 |
| octet 2 | P/F | N(R) (higher order) | | | | | | |
| octet 3 | | N(R) (lower order) | | | | | | RES |

The SREJ frame is used to request retransmission of single frame or multiple frames (single+payload) identified in the N(R) field+payload field. When sent as a command frame, if the P bit of the SREJ frame is set to 1, the I frames numbered up to N(R)−1 inclusive, are considered as acknowledged. However, if the P bit is 0, then the N(R) of the SREJ frame does not indicate acknowledgment of I frames. In a response frame, no acknowledgment is allowed. The SREJ condition is cleared upon receipt of an I-frame with an N(S) equal to the N(R) of SREJ frame. Once a SREJ frame has been received, the I-frame that may have been transmitted following the I-frame indicated by the SREJ frame is not be retransmitted as a result of receiving the SREJ frame. Additional I-frames awaiting initial transmission may be transmitted following the retransmission of the requested I-frame. The SREJ frame format is shown as:

| | 8 | 7 | 6 | 5 | 4 | 3 | 2 | 1 |
|---|---|---|---|---|---|---|---|---|
| octet 1 | 0 | 0 | 0 | 0 | 1 | 1 | 0 | 1 |
| octet 2 | P/F = 0 | N(R) (higher order) | | | | | | |
| octet 3 | | N(R) (lower order) | | | | | | RES |
| octet 4 | Payload | | | | | | | |
| octet 4+ | 2*MAX_ALLOWED_SREJ_FRAMES | | | | | | | |

SREJ PAYLOAD:

| | Octet 1 | Octet 2 |
|---|---|---|
| word 1 | NUM_MISSED_FRAMES | |
| word 2 | 1st mis. frame N(R)/num. continues missed frames | |
| word 3 | 2nd missed frame sequence number | |
| word 4 | 3rd missed frame sequence number | |
| word 5 | 4th missed frame sequence number | |
| MAX_ ALLOWED_ SREJ_FRAMES | MAX missed frame sequence number | |

The actual length of the payload is equal to the maximum number of allowed missed frames. Word 1 (2 octets) contains a value from "0" to MAX_ALLOWED_SREJ_FRAMES. When Word 1 is set to 0, it indicates that the SREJ payload identifies continuous frames with the total number of missed frames indicated in Word 2. When Word 1 is not equal to 0, it designates the total number of non-continuous missed frames, with each frame sequence respectively identified in Words 2, 3, 4 . . . etc.

Figure 2:
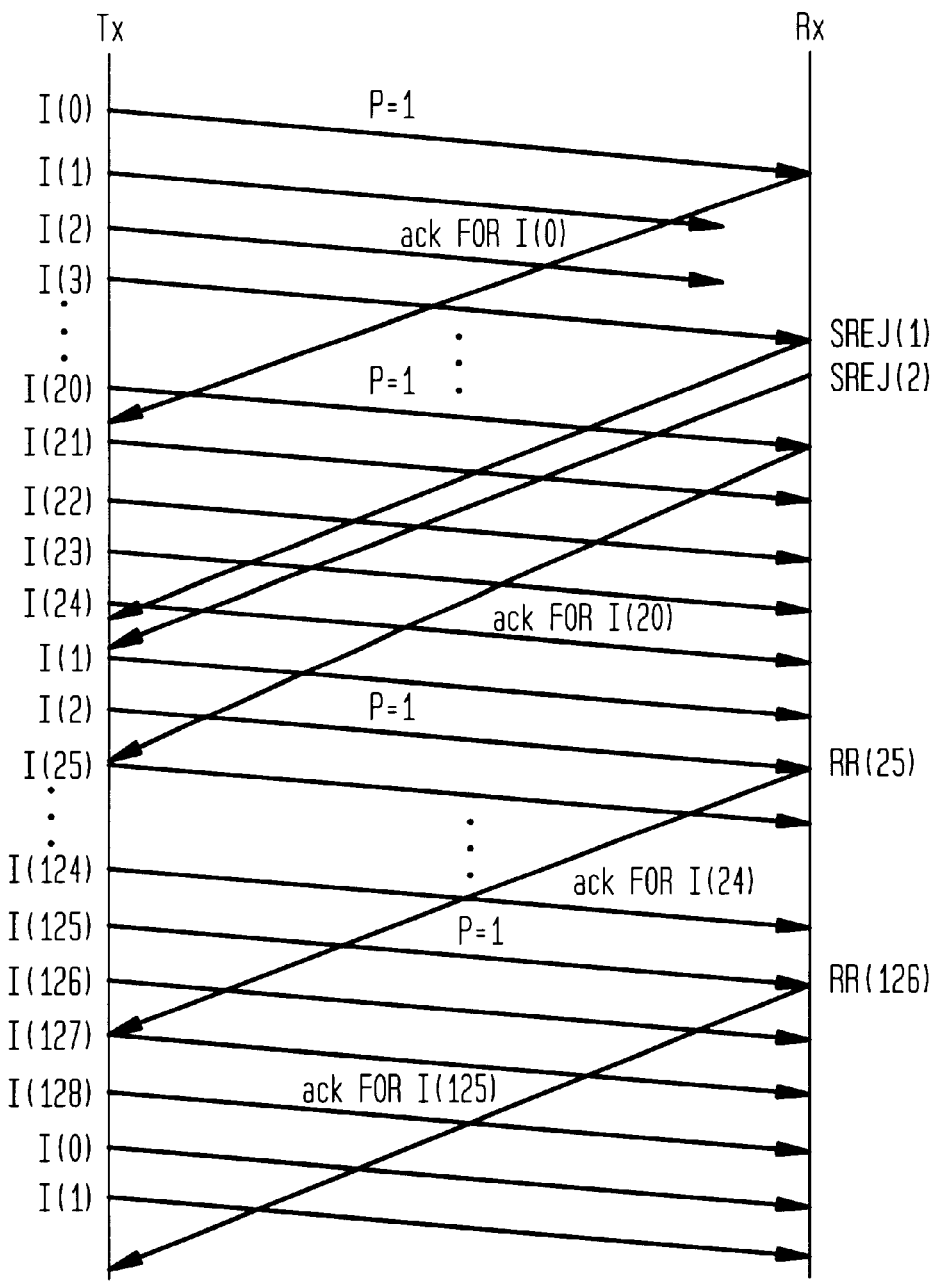
FIG. 2 is an operational flow diagram of the normal data transfer between the packet transmitting and receiving stations Tx and Rx, respectively using an SREJ mechanism in accordance with the prior art.

Referring now to FIG. 2, in normal data transfer protocols using SREJ mechanisms Rx will immediately acknowledge all I-frames received with the poll bit ON (P=1). If the poll bit is OFF (P=0), Rx starts the "piggyback timer" T205 and waits for upper layer data to be communicated to Tx. If Rx receives the upper layer data prior to the expiration of T205, the acknowledgment (ACK) is piggybacked onto that data. If T205 expires prior to receiving the upper layer data, Rx immediately sends an ACK upon T205 expiration. When Rx detects that a frame is missing (i.e., lost), it sends the SREJ message with the sequence number of the missing frame. If several frames have been lost, Rx will send multiple SREJ messages. As shown in FIG. 2, upon receiving I(3) Rx determines that I(1) and I(2) were lost in transit. In accordance with the prior art, Rx would send two SREJ messages: SREJ(1) and SREJ(2). These frames are then respectively sent in sequence after I(24). Upon receiving I(1) and I(2), Rx sends an ACK for all successfully received frames in the from of a Receive Ready message, RR(25), indicating that the frames N(R)−1 up to 24 were successfully received and that Rx is expecting to receive I(25). Using this selective reject mechanism, only selective frames that were missed are retransmitted so that Rx will keep on receiving all subsequent frames until the sender's window fills up. This protocol works fine where the BER is relatively low. For noisy wireless environments subject to burst errors, however, sending multiple SREJ messages is inefficient.

Figure 3:
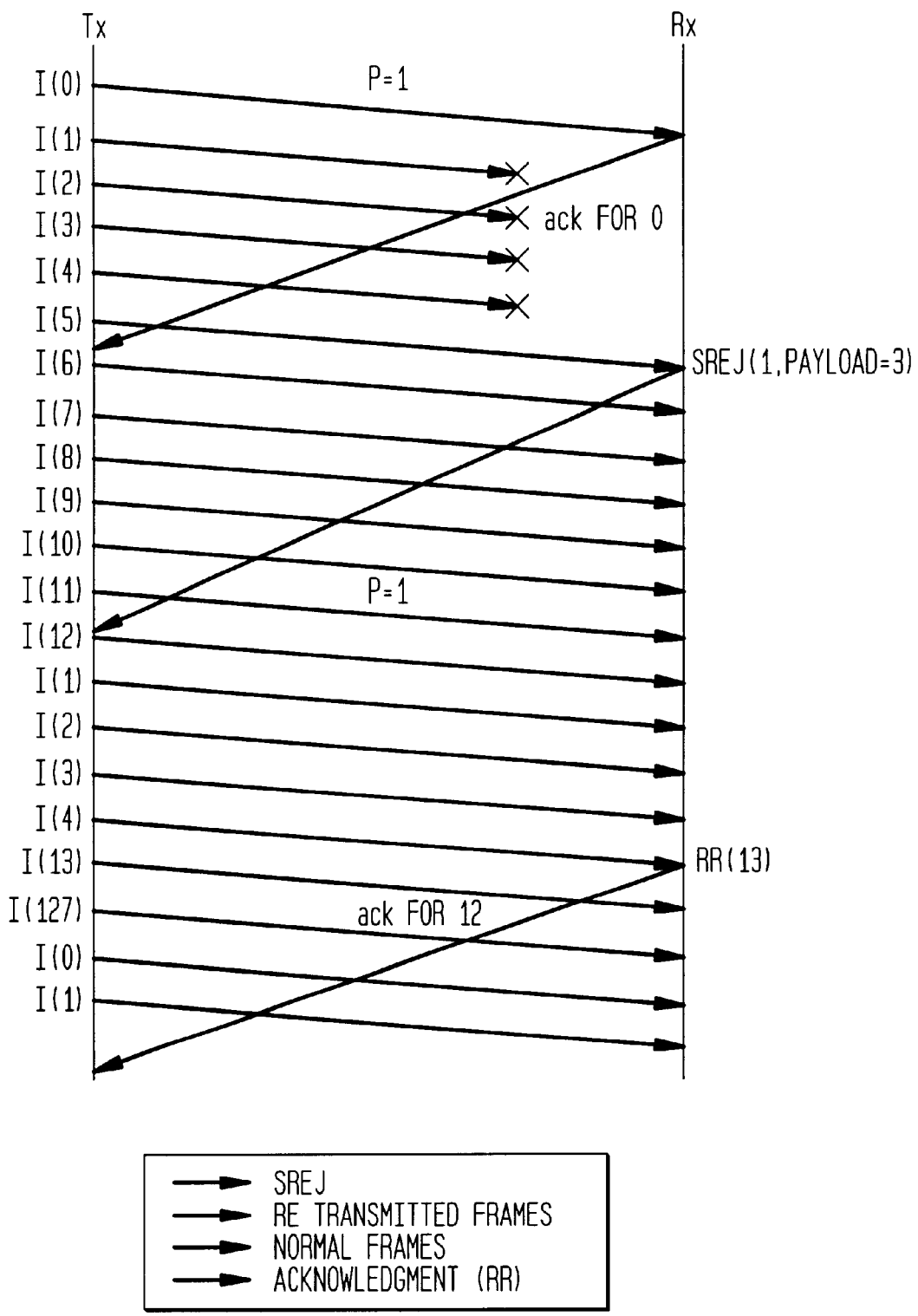
FIG. 3 is an operational flow diagram of an SREJ payload mechanism.

Referring now to FIG. 3, there is depicted an SREJ protocol that utilizes a "payload" for indicating a loss and requesting the retransmission of multiple frames in sequence. As shown in the FIG. 3, I frames (1–4) have been lost in transit between Tx and Rx. Upon successful receipt of I(5), Rx detects missing frames I(1), I(2), I(3) and I(4). Rx generates an SREJ with sequence number I(1) and payload= 3, indicating that excluding sequence number 1, the next consecutive 3 frames were lost and need to be resent. When Tx receives the SREJ, it retransmits I(1), I(2), I(3) and I(4). Upon successful receipt of frames 1–4, Rx sends RR(13) acknowledging frames I(1–12), and indicating to Tx that it is expecting to receive frame I(13).

Figure 4:
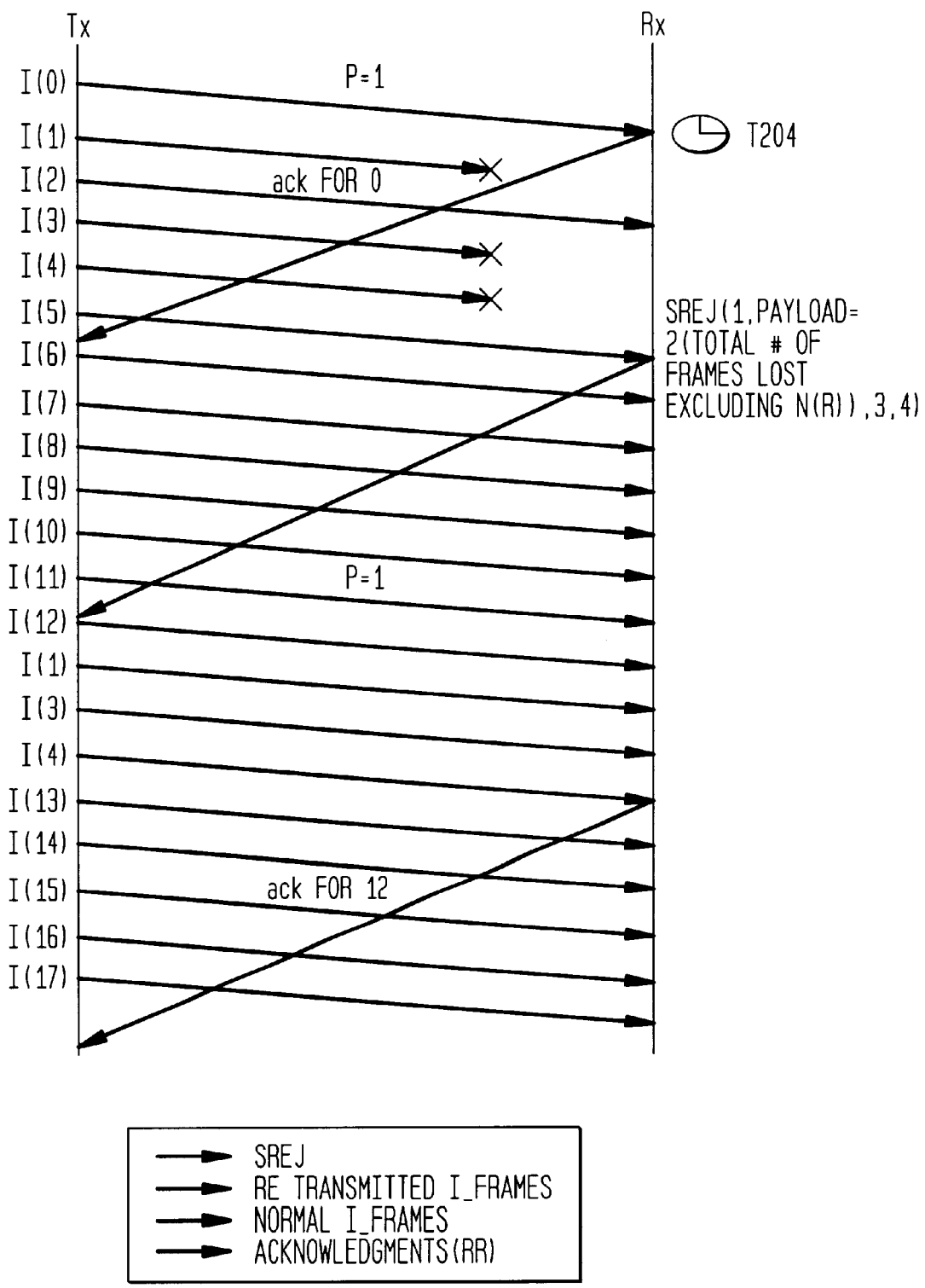
FIG. 4 is an operational flow diagram of an SREJ mechanism in accordance with the present invention where non-continuous frames are lost.
Figure 5:
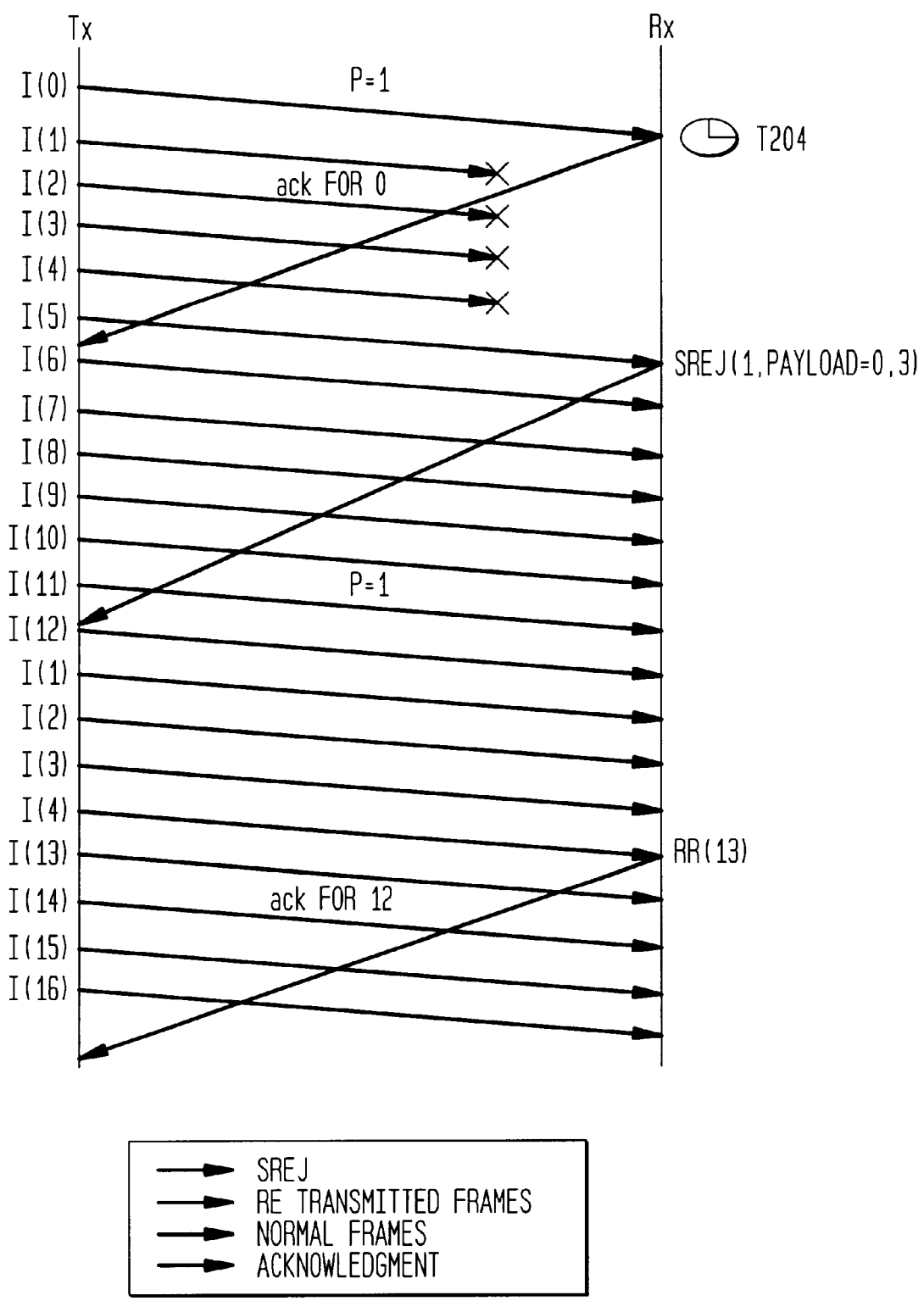
FIG. 5 is an operational flow diagram of an SREJ payload mechanism in accordance with the present invention where continuous frames are lost.
Figure 6:
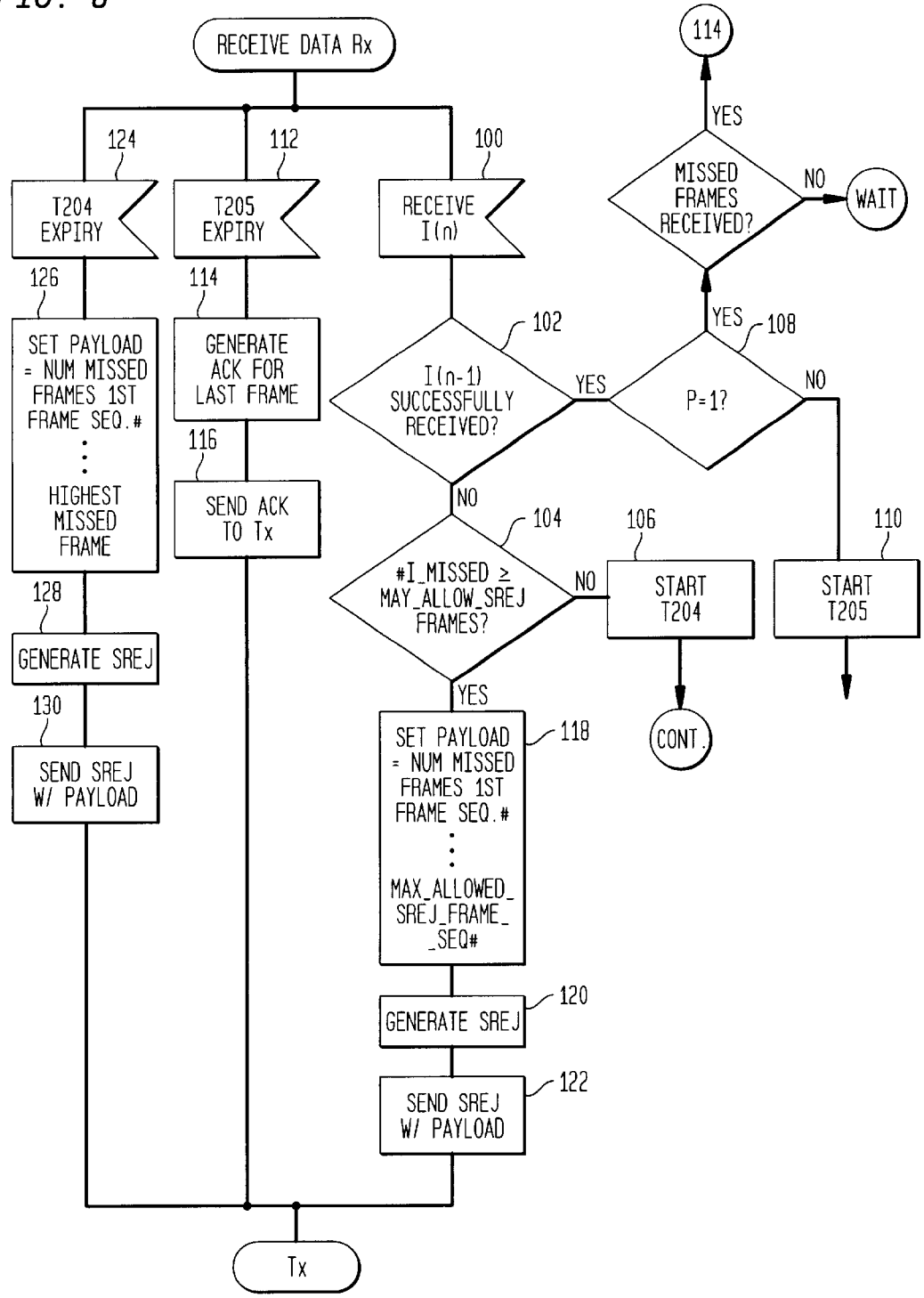
FIG. 6 is a flowchart of the SREJ mechanism.

Referring now to FIGS. 4–6 there are depicted operational flow diagrams of an enhanced SREJ protocol in accordance with the present invention. FIG. 4 illustrates the loss of a single frame I(1), followed by successful receipt of the next frame in sequence I(2) and then loss of two consecutive frames I(3) and I(4). As can be seen in FIG. 4, I-frames (0–N) are communicated between Tx and Rx. At step 100 (FIG. 6), I(N) is received by Rx. Rx checks whether I(N−1) was successfully received at step 102. Here in the example shown and described, I(1) has been lost as indicated by the "x" in FIG. 4. Upon receiving frame I(2), Rx detects that frame I(1) was lost at step 102. If a frame is missing, Rx checks whether the number of missed frames≧MAX_ALLOW_SREJ_FRAMES at step 104. The latter value is set to three frames for the purpose of illustration herein, but in practical applications this variable is selected based upon link parameters such as data rate, frame error rate and propagation delay. Thus, Rx will not generate and send an SREJ for a single missed frame, I(1) because MAX_ALLOW_SREJ_FRAMES=3. In this case, Rx starts T204 at step 106. At the same time, if I(N) is received with P=1 (step 108), Rx starts piggyback timer T205 at step 110. Upon expiration of T205 (step 112), Rx generates an ACK for the last frame received (step 114), and send the acknowledgment to Tx at step 116. If P=1 at step 108, then Rx will send an ACK immediately to Tx at step 114. Rx detects the loss of frames I(3) and I(4) upon successful receipt of I(5), in step 104, and then determines that the number of missed frames equals MAX_ALLOW_SREJ_FRAMES (3) In step 118 Rx sets payload=number of missed frames, $1^{st}$ frame sequence number . . . MAX_ALLOW_SREJ_FRAME sequence number. The format of the payload is depicted above. The initial sequence number N(R) is set to 1 and the payload is set to 2, indicating the total number of frames lost excluding N(R). In this case missing frames I(3) and I(4) are identified in words 2 and 3, respectively. Rx generates the SREJ at step 120, and sends the SREJ w/payload to Tx at step 122. If T204 expires at step 124 prior to the number of missed frames being greater than or equal to MAX_ALLOW_SREJ_FRAMES in step 104, then Rx sets payload=number of missed frames, $1^{st}$ frame sequence number . . . highest missed frame in step 126. Rx then generates the SREJ in step 128 and sends the SREJ to Tx in step 130. Frames I(1), I(3) and I(4) are retransmitted to Rx after I(12) as shown in FIG. 4. With P=1 at I(11), Rx sends an RR(13) upon successful receipt of I(4) indicating that frames 1–12 have been successfully received and that Rx is expecting receipt of I(13). Rx does not send an acknowledgment for I(11) even though P=1, but rather waits until all missed frames have been received.

Referring now to FIG. 5, there is depicted another example where continuous frames I(1), I(2), I(3) and I(4) are lost. When Rx receives I(5), it determines which frames are missing. Here, MAX_ALLOW_SREJ_FRAMES is set to 3, so Rx will immediately generate the SREJ with the payload format as follows. Octet 1 is set to 0 (meaning the next octet carries the number of continuous frames that need to be transmitted), and octet 2 set to 3 (indicating that excluding 1, three additional continuous frames need to be transmitted). Upon successful receipt by Rx of the retransmitted frames I(1), I(2), I(3) and I(4), Rx sends RR(13) to Tx, indicating that 12 frames have been successfully received and that Rx is expecting to receive frame I(13).

The present invention has been shown in what are considered to be the most practical and preferred embodiments. It is anticipated, however, that departures may be made therefrom and that obvious modifications will be implemented by those skilled in the art.

We claim:

1. A method of recovering lost frames transmitted between a packet data sending unit and a packet data receiving unit in a data communications system, the method comprising:

successfully receiving a frame at the packet data receiving unit;

identifying a failure to successfully receive at least one frame prior to the frame successfully received at the packet data receiving unit;

upon identifying the failure to successfully receive at least one frame, setting a selective reject wait timer at the packet data receiving unit; and upon expiration of the selective reject wait timer, generating a selective reject message at the packet data receiving unit, the selective reject message including a payload indicating a first missed frame and subsequent missed frames.

2. The method of claim 1, further comprising:

determining whether a number of missed frames is greater than or equal to a predetermined threshold; and where the number of missed frames is greater than or equal to a predetermined threshold before expiration of the selective wait timer, generating a selective reject message at the packet data receiving unit, the selective reject message including a payload indicating a first missed frame and subsequent missed frames.

3. The method of claim 1, further comprising, upon successful receipt of retransmitted missed frames from the packet data sending unit, generating a receive ready message at the packet data receiving unit and sending the receive ready message to the packet data sending unit.

4. A method of recovering lost frames transmitted between a packet data sending unit and a packet data receiving unit in a data communications system, the method comprising:

successfully receiving a frame at the packet data receiving unit;

identifying a failure to successfully receive at least one frame prior to the frame successfully received at the packet data receiving unit and setting a selective reject wait timer;

determining whether a number of missed frames is greater than or equal to a predetermined threshold; and generating a selective reject message, the selective reject message including a payload indicating a first missed frame and subsequent missed frames, upon expiration of the selective reject wait timer or determining that a number of missed frames exceeds said predetermined threshold, and sending the selective reject message to the packet data sending unit.

5. The method of claim 4, further comprising:

upon successful receipt of the retransmitted missed frames from the packet data sending unit, generating a receive ready message at the packet data receiving unit and sending the receive ready message to the packet data sending unit.

6. In a data receiving unit, a method of recovering lost frames sent in sequence by a data sending unit, the method comprising:

receiving a first frame from the data sending unit;

upon receipt of the first frame, generating an acknowledgement for the data sending unit, the acknowledgement indicating that the first frame has been received;

identifying a failure to receive a second frame from the data sending unit;

setting a selective reject wait timer upon identifying the failure to receive the second frame;

prior to expiration of the selective reject wait timer, identifying a failure to receive one or more subsequent frames; and generating a selective reject message upon expiration of the selective reject wait timer, the selective reject message including a payload indicating the failure to receive the second frame and the one or more subsequent frames, wherein the one or more subsequent frames need not be consecutive.

7. The method of claim 6, wherein at least one frame is successfully received after identifying a failure to receive the second frame but before identifying the failure to receive the one or more subsequent frames.

8. The method of claim 6, further comprising:

successfully receiving the second frame and the one or more subsequent frames after retransmission by the sending unit; and upon successful receipt the second frame and the one or more subsequent frames, generating a receive ready message and sending the receive ready message to the data sending unit.

9. The method of claim 6, further comprising:

determining whether a number of the identified one or more subsequent frames is greater than or equal to a predetermined threshold; and where the number of the identified one or more subsequent frames is greater than or equal to a predetermined threshold before expiration of the selective wait timer, generating a selective reject message, the selective reject message including a payload indicating the second frame and the one or more subsequent missed frames.

10. The method of claim 6, wherein data, including frames, is transmitted between the data receiving unit and the data sending unit via an asymmetrical data link.

11. An apparatus for use in a wireless packet data communication system, the apparatus configured for receiving packet data, the apparatus comprising:

means for receiving a first frame from the data sending unit;

means for generating an acknowledgement for the data sending unit, the acknowledgement indicating that the first frame has been received;

means for identifying a failure to receive a second frame from the data sending unit;

means for setting a selective reject wait timer upon identifying the failure to receive the second frame;

means for identifying a failure to receive one or more subsequent frames; and means for generating a selective reject message upon expiration of the selective reject wait timer, the selective reject message including a payload indicating the failure to receive the second frame and the one or more subsequent frames.

12. The apparatus of claim 11, further comprising:

means for determining whether a number of the one or more subsequent frames is greater than or equal to a predetermined threshold; and where the number of one or more subsequent frames is greater than or equal to a predetermined threshold before expiration of the selective wait timer, generating a selective reject message at the data receiving unit, the selective reject message including a payload indicating a first second frame and the one or more subsequent frames.

13. The apparatus of claim 11, further comprising means for advancing a receiving window upon successful receipt of a frame, the receiving window corresponding to frames that the apparatus is permitted to accept at a given time.

14. In a data sending unit, a method of recovering lost frames destined for a data receiving unit, the method comprising:

receiving data;

sending multiple frames containing the received data, wherein the frames are sent sequentially;

storing a representation of sent frames, the representation including an indication of each sent frame that has not been acknowledged as received by the data receiving unit, the indication of each sent frame stored until receipt of an acknowledgement from the data receiving unit;

receiving a selective reject message from the data receiving unit, wherein the data receiving unit transmits the selective reject message upon expiration of a selective reject wait timer set by the data receiving unit upon identifying a failure to successfully receive at least one frame prior to a frame successfully received at the data receiving unit;

resending at least some of a plurality of missed frames upon receipt of the selective reject message from the data receiving unit; and upon receipt of an acknowledgement that a frame has been received, updating the representation of sent frames by removing the indication of the sent frame corresponding to the received acknowledgement.

15. The method of claim 14, further comprising receiving a receive ready message generated at the data receiving unit.

16. The method of claim 14, wherein the data receiving unit successfully receives at least one frame after identifying a failure to receive a previous frame from a plurality of missed frames, but before identifying the failure to receive all frames from the plurality of missed frames.

17. The method of claim 14, wherein the stored representation of sent frames is a sending window that continuously maintains a list of unacknowledged frames.

18. The method of claim 14, wherein the stored representation of sent frames is a sending window that maintains a list of unacknowledged frames, and wherein the sending window has a maximum size, which, if exceeded, causes a data link layer to discontinue receipt of data from a network layer.

19. An apparatus for use in a wireless packet data communication system, the apparatus configured for sending packet data to a data receiving unit, the apparatus comprising:

means for receiving data;

means for sending multiple frames containing the received data, wherein the frames are sent sequentially;

means for storing a representation of sent frames until receipt of an acknowledgement from the data receiving unit;

means for receiving a selective reject message from the data receiving unit, wherein the data receiving unit transmits the selective reject message upon expiration of a selective reject wait timer set by the data receiving unit upon identifying a failure to successfully receive at least one frame prior to a frame successfully received at the data receiving unit;

means for resending at least some of a plurality of missed frames upon receipt of the selective reject message from the data receiving unit; and means for updating the representation of sent frames that have not been acknowledged as received by the data receiving unit.

20. The apparatus of claim 19, further comprising means for receiving a receive ready message from the data receiving unit.

* * * * *